(12) United States Patent
Láinez Rodrigo et al.

(10) Patent No.: US 11,809,804 B2
(45) Date of Patent: Nov. 7, 2023

(54) TEXT FORMATTER

(71) Applicant: Twilio Inc., San Francisco, CA (US)

(72) Inventors: Alfredo Láinez Rodrigo, Madrid (ES); Luke Percival de Oliveira, San Francisco, CA (US); Umair Akeel, San Ramon, CA (US); Tyler Cole, Diamond Bar, CA (US)

(73) Assignee: Twilio Inc., San Francisco, CA (US)

( * ) Notice: Subject to any disclaimer, the term of this patent is extended or adjusted under 35 U.S.C. 154(b) by 394 days.

(21) Appl. No.: 17/303,279

(22) Filed: May 26, 2021

(65) Prior Publication Data

US 2022/0382959 A1 Dec. 1, 2022

(51) Int. Cl.
*G06F 40/103* (2020.01)
*G06N 20/00* (2019.01)
*G06F 40/166* (2020.01)
*G06F 40/30* (2020.01)

(52) U.S. Cl.
CPC .......... *G06F 40/103* (2020.01); *G06F 40/166* (2020.01); *G06N 20/00* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 5,384,703 A | 1/1995 | Withgott et al. | |
| 6,567,805 B1 | 5/2003 | Johnson et al. | |
| 7,801,910 B2 | 9/2010 | Houh et al. | |
| 8,494,133 B2 | 7/2013 | Jeffs et al. | |
| 8,775,165 B1 | 7/2014 | Oikawa | |
| 8,798,242 B1 | 8/2014 | Sankaranarayanan | |

(Continued)

FOREIGN PATENT DOCUMENTS

WO WO-2022086939 A1 * 4/2022

OTHER PUBLICATIONS

Efstathiou et al., "Semantic Source Code Models Using Identifier Embeddings" 2019 IEEE/ACM 16th International Conference on Mining Software Repositories (MSR), © 2019 IEEE, pp. 29-33. (Year: 2019).*

(Continued)

*Primary Examiner* — Amelia L Tapp
(74) *Attorney, Agent, or Firm* — Schwegman Lundberg & Woessner, P.A.

(57) ABSTRACT

Methods, systems, and computer programs are presented for formatting raw text. One method includes an operation for accessing raw text comprising words corresponding to one or more sentences. The raw text is lowercase text without any punctuation. Further, the method includes operations for creating a plurality of sub-words corresponding to the raw text, and for generating, by a machine-learning (ML) model, an output for each sub-word based on the created sub-words. The output for each sub-word indicates a formatting operation for the corresponding sub-word. The method further includes an operation for generating, based on the formatting operations in the outputs for the sub-words, formatted text corresponding to the raw text. The formatted text is text with correct grammar, proper punctuation, and proper capitalization according to a meaning of words spoken by a speaker associated with the raw text.

23 Claims, 11 Drawing Sheets

(56) References Cited

U.S. PATENT DOCUMENTS

| | | | |
|---|---|---|---|
| 8,942,359 | B2 | 1/2015 | Seetharaman et al. |
| 9,880,807 | B1 | 1/2018 | Haggerty et al. |
| 9,910,909 | B2 | 3/2018 | Hegde et al. |
| 9,965,726 | B1 * | 5/2018 | Tablan .................. G06N 20/00 |
| 10,089,639 | B2 | 10/2018 | Kannan et al. |
| 10,467,339 | B1 * | 11/2019 | Shen .................... G06F 40/247 |
| 10,839,335 | B2 | 11/2020 | Weisman et al. |
| 11,165,900 | B2 | 11/2021 | Sachdev |
| 11,170,175 | B1 * | 11/2021 | Kohli ...................... G06N 3/08 |
| 11,475,210 | B2 | 10/2022 | De Oliveira et al. |
| 2002/0046018 | A1 | 4/2002 | Marcu et al. |
| 2015/0046783 | A1 | 2/2015 | O'donoghue et al. |
| 2015/0256677 | A1 | 9/2015 | Konig et al. |
| 2020/0279017 | A1 | 9/2020 | Norton et al. |
| 2022/0067269 | A1 | 3/2022 | De Oliveira et al. |
| 2022/0156296 | A1 | 5/2022 | De Oliveira et al. |
| 2022/0156460 | A1 | 5/2022 | Láinez Rodrigo et al. |
| 2022/0210268 | A1 | 6/2022 | Cole et al. |
| 2022/0414319 | A1 | 12/2022 | De Oliveira et al. |

OTHER PUBLICATIONS

"U.S. Appl. No. 17/447,039, Response filed Nov. 16, 2022 to Non Final Office Action dated Aug. 16, 2022", 11 pgs.
"U.S. Appl. No. 17/447,039, Final Office Action dated Feb. 21, 2023", 11 pgs.
"U.S. Appl. No. 17/304,081, Notice of Allowance dated Jun. 9, 2022", 9 pgs.
"U.S. Appl. No. 17/304,081, Notice of Allowability dated Jul. 20, 2022", 2 pgs.
U.S. Appl. No. 17/305,976, filed Jul. 19, 2021, Transition-Driven Search.
U.S. Appl. No. 17/447,039, filed Sep. 7, 2021, Tool for Annotating and Reviewing Audio Conversations.
U.S. Appl. No. 17/304,081, filed Jun. 14, 2021, Language Model for Abstractive Summarization.
U.S. Appl. No. 17/449,405, filed Sep. 29, 2021, Tool for Categorizing and Extracting Data From Audio Conversations.
Ba, Jimmy Lei, "Layer Normalization", arXiv preprint, arXiv:1607.06450v1 [stat.ML], (Jul. 21, 2016), 14 pgs.
Celikyilmaz, Asli, "Deep Communicating Agents for Abstractive Summarization", arXiv preprint, arXiv:1803.10357v3 [cs.CL], (Aug. 15, 2018), 14 pgs.
Chopra, Sumit, "Abstractive Sentence Summarization with Attentive Recurrent Neural Networks", Proceedings of the NAACL-HLT16, (2016), 93-98.
Dai, "Semi-supervised Sequence Learning", arXiv preprint, arXiv:1511.01432 [cs.LG], (Nov. 4, 2015), 10 pgs.
Devlin, Jacob, "BERT: Pre-training of Deep Bidirectional Transformers for Language Understanding", arXiv preprint, arXiv:1810.04805 [cs.CL], (2018), 14 pgs.
Gehrmann, Sebastian, "Bottom-Up Abstractive Summarization", arXiv preprint, arXiv:1808.10792v2 [cs.CL], (Oct. 9, 2018), 12 pgs.
Gu, Jiatao, "Incorporating Copying Mechanism in Sequence-to-Sequence Learning", arXiv preprint, arXiv:1603.06393v3 [cs.CL], (Jun. 8, 2016), 10 pgs.
Holtzman, Ari, "The Curious Case of Neural Text Degeneration", 8th International Conference on Learning Representations (ICLR), (Apr. 2020), 16 pgs.
Howard, Jeremy, "Universal Language Model Fine-tuning for Text Classification", arXiv preprint, arXiv:1801.06146v5 [cs.CL], (May 23, 2018), 12 pgs.
Kingma, Diederik P, "Adam: A Method for Stochastic Optimization", arXiv preprint, arXiv:1412.6980v9 [cs.LG], (Jan. 30, 2017), 15 pgs.
Kudo, Taku, "SentencePiece: A simple and language independent subword tokenizer and detokenizer for Neural Text Processing", arXiv preprint, arXiv:1808.06226v1 [cs.CL], (Aug. 19, 2018), 6 pgs.
Li, Piji, "Actor-Critic based Training Framework for Abstractive Summarization", arXiv preprint, arXiv:1803.11070v2 [cs.CL], (Aug. 15, 2018), 10 pgs.
Lin, Chin-Yew, "ROUGE: A Package for Automatic Evaluation of Summaries", Text Summarization Branches Out: Proceedings of the ACL-04 Workshop, Barcelona, Spain., (2004), 8 pgs.
Liu, Peter J, "Generating Wikipedia by Summarizing Long Sequences", arXiv preprint, arXiv:1801.10198v1 [cs.CL], (Jan. 30, 2018), 18 pgs.
Lloret, Elena, "The Challenging Task of Summary Evaluation: An Overview", Author preprint, Language Resources and Evaluation, 52:1, 101-148, (2017), 54 pages.
Nallapati, Ramesh, "Abstractive Text Summarization using Sequence-to-sequence RNNs and", arXiv preprint, arXiv:1602.06023v5 [cs.CL], (Aug. 26, 2016), 12 pgs.
Narayan, Shashi, "Don't Give Me the Details, Just the Summary.", arxiv prepint, arixiv 1808.08745v1 cs.cl, (Aug. 27, 2018), 11 pages.
Paulus, Romain, "A Deep Reinforced Model for Abstractive Summarization", arXiv:1705.04304v3 [cs.CL], (Nov. 13, 2017), 12 pgs.
Peters, Matthew, "Deep contextualized word representations", Proceedings of the 2018 Conference of the North American Chapter of the Association for Computational Linguistics: Human Language Technologies, vol. 1 Long Papers, (2018), 11 pgs.
Radford, Alec, "Improving Language Understanding Generative Pre-Training", author preprint, (2018), 12 pgs.
Radford, Alec, "Language Models are Unsupervised Multitask Learners", author preprint, (2018), 24 pgs.
Rush, Alexander M, "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, "Get to the Point: Summarization with Pointer-Generator Networks", arXiv preprint, arXiv:1704.04368v2 [cs.CL], (Apr. 25, 2017), 20 pgs.
Sennrich, Rico, "Neural Machine Translation of Rare Words with Subword Units", arXiv preprint, arXiv:1508.07909v5 [cs.CL], (Jun. 10, 2016), 11 pgs.
Sutskever, Ilya, "Sequence to Sequence Learning with Neural Networks", arXiv preprint, arXiv:1409.3215v3 [cs.CL], (Dec. 14, 2014), 9 pgs.
Tu, Zhaopeng, "Modeling Coverage for Neural Machine Translation", arXiv preprint, arXiv:1601.04811v6 [cs.CL], (Aug. 6, 2016), 11 pgs.
Vaswani, Ashish, "Attention is All You Need", 31st Conference on Neural Information Processing Systems (NIPS), arxiv:1706.03762v5 [cs.CL], (Dec. 6, 2017), 15 pgs.
Vinyals, Oriol, "Pointer Networks", arXiv preprint, arXiv:1506.03134v2 [stat.ML], (Jan. 2, 2017), 9 pgs.
Wu, Yonghui, "Googles Neural Machine Translation System: Bridging the Gap between Human and Machine Translation", arXiv preprint, arXiv:1609.08144v2 cs.CL, (Oct. 8, 2016), 23 pgs.
Zeng, Wenyuan, "Efficient Summarization with Read-Again and Copy Mechanism", arXiv preprint, arXiv:1611.03382v1 [cs.CL], (Nov. 10, 2016), 11 pgs.
"U.S. Appl. No. 17/447,039, Non Final Office Action dated Aug. 16, 2022", 10 pgs.
"U.S. Appl. No. 17/447,039, Examiner Interview Summary dated Nov. 7, 2022", 2 pgs.
"U.S. Appl. No. 17/447,039, Response filed Apr. 21, 2023 to Final Office Action dated Feb. 21, 2023", 11 pgs.
"U.S. Appl. No. 17/447,039, Notice of Allowance dated May 12, 2023", 11 pgs.
"U.S. Appl. No. 17/939,176, Non Final Office Action dated Jun. 15, 2023", 8 pgs.
U.S. Appl. No. 17/939,176, filed Sep. 7, 2022, Language Model for Abstractive Simmarization.

* cited by examiner

200

0:01:37 / 0:16:20    ↺ ↻    -1.0x + 🔊

FIND KEYWORDS AND PHRASES 🔍    ⚙

| | |
|---|---|
| CHECKLIST ANNOTATIONS | |
| NAME AGENT | 2 |
| NOTICE NUM | 0 |
| RECORDING | 1 |
| DEPENDENTS | 0 |
| PROFANITY | 0 |

NOTICE NUMBER
VAB00000000 ⓘ

CALL OUTCOME
SELECT OUTCOME

CALL SENTIMENT
SELECT SENTIMENT

[ COMPLETE ]

---

CUSTOMER 0:01:26 — 1 of leading life insurance services in America and help over 10000 people each month on the right policy. I [inaudible] personalized plan. The messages. You need some budget. As I said, my name is Brittney [name agent]. I'm a senior license agent that specializes in your area, and my job is just be your advocating guide. You to the right plan basically needs for life insurance. Now are you looking at rates for yourself? Or did you need coverage for others and your family as well?

AGENT 0:01:28 — Yes. Myself.

CUSTOMER 0:01:36 — Okay, and let me see here. Are you currently employed? Retired on social security disability?

AGENT 0:01:36 — Oh God [inaudible]

CUSTOMER 0:01:41 — Okay. Did you
- EFFICIENTLY LISTEN AND REVIEW CONVERSATION
- SEE HUMAN AND MACHINE-GENERATED ANNOTATIONS
- EASY TAGGING

AGENT 0:01:36 — I'm retired.

CUSTOMER 0:01:28 — Okay, I'm sorry about that.

CUSTOMER 0:01:36 — Well 1 person call me last week and I couldn't finish that. Then she made me wait, and then the second 1 took the information again ...

FIG. 2

TEXT FORMATTER OPERATIONS hi carlos how are you doing my phone number in the u._s._a._ is one one two two four four five five six six i heard you have two thousand friends in the united nations

402 Capitalize acronyms and spellings hi carlos how are you doing my phone number in the USA is one one two two four four five five six six i heard you have two thousand friends in the united nations

403 Punctuate text

Hi carlos, how are you doing? My phone number in the USA is one, one, two, two, four, four, five, five, six, six. I heard you have two thousand friends in the united nations.

404 Capitalize entities

Hi Carlos, how are you doing? My phone number in the USA is one, one, two, two, four, four, five, five, six, six. I heard you have two thousand friends in the United Nations.

405 Format numbers and URLS

Hi Carlos, how are you doing? My phone number in the USA is one, one, two, two, four, four, five, five, six, six. I heard you have 2000 friends in the United Nations.

406 Format phone numbers

Hi Carlos, how are you doing? My phone number in the USA is (112) 244-5566. I heard you have 2000 friends in the United Nations.

FIG. 4

TEXT FORMATTER

TECHNICAL FIELD

The subject matter disclosed herein generally relates to methods, systems, and machine-readable storage media for formatting raw text and, more particularly, methods, systems, and machine-readable storage media for formatting text extracted from audio conversations.

BACKGROUND

Typically, natural language processing (NLP) tools convert the audio from a person talking to a sequence of words. The result is referred to as raw text, which is text without any punctuation or capitalization. For example, the raw text includes a set of lowercase words without commas, periods, semicolons, question marks, etc.

The raw text is then converted to formatted text. To properly format the raw text, it is necessary to understand the meaning of the text, because improper formatting may result in text that does not reflect the intention of the speaker. For example, a raw sentence "the things i love the most are cooking new clothes and not using commas" should be formatted as, "The things I love the most are cooking, new clothes, and not using commas." However, if commas were improperly placed, or just missing at all, the sentence could be improperly formatted as, "The things I love the most are cooking new clothes, and not using commas," which has a very different meaning.

There have been legal cases where the interpretation of contracts hinge on a comma. For example, in 2018, a dairy company in the Portland, Maine settled a court case for $5 million because of a missing comma.

What is needed is a text formatter for raw text that formats the text properly according to the intended meaning of the speaker.

BRIEF DESCRIPTION OF THE DRAWINGS

The appended drawings merely illustrate example embodiments of the present disclosure and cannot be considered as limiting its scope.

FIG. 2 is a diagram of a User Interface (UI) that includes examples of options for tagging sections of the conversation, according to some example embodiments.

FIG. 4 illustrates several formatting techniques with examples, according to some embodiments.

DETAILED DESCRIPTION

Example methods, systems, and computer programs are directed to formatting raw text, which is text that includes a set of lowercase words without any punctuation (e.g., commas, periods, semicolons, question marks). The result is formatted text, which is text with correct grammar, proper punctuation, and proper capitalization, according to the intended meaning of the speaker. The formatted text includes proper capitalization of sentences and proper names, periods, commas, question marks, etc.

One general aspect includes a method that includes an operation for accessing raw text comprising a plurality of words corresponding to one or more sentences. Further, the method includes operations for creating a plurality of sub-words corresponding to the raw text, and for generating, by a machine-learning (ML) model, an output for each sub-word based on the created sub-words. The output for each sub-word indicates a formatting operation for the corresponding sub-word. The method further includes an operation for generating, based on the formatting operations in the outputs for the sub-words, formatted text corresponding to the raw text. The text is formatted according to a meaning of words spoken by a speaker associated with the raw text.

Figure 1:
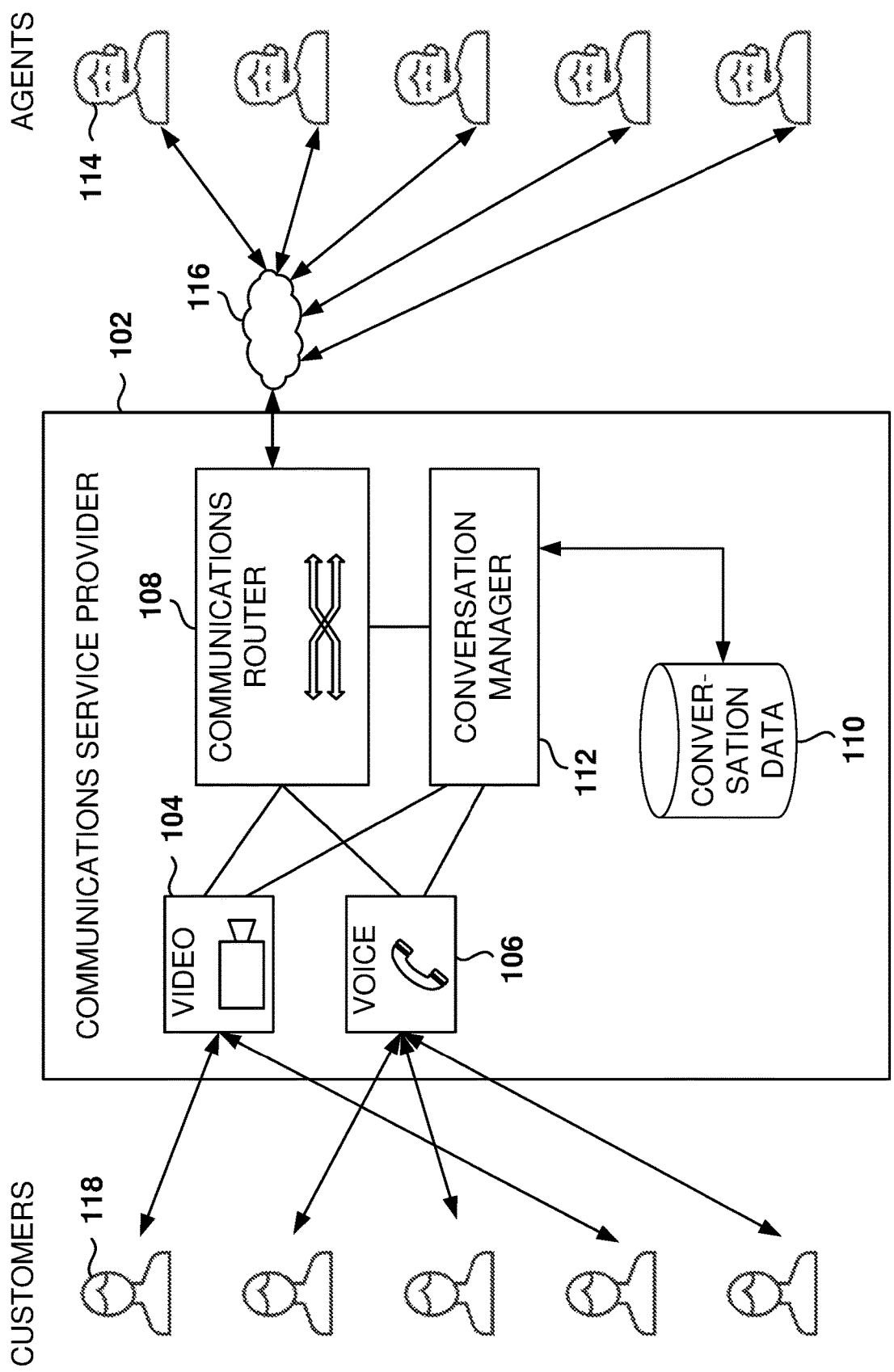
FIG. 1 is a schematic diagram showing an architecture of a communications service provider that provides call center services, according to some example embodiments.

FIG. 1 shows an architecture of a communications service provider 102 that provides call center services, according to some example embodiments. In some example embodiments, a communications service provider 102 provides call-center services to facilitate voice and data communications between customers 118 and agents 114.

The agents 114 may work for a plurality of companies that use the services of the communications service provider 102. The customers 118 may use the functionality of the communication service provider 102 to establish video and voice conversations to communicate with the agents 114, such as for requesting support for a product or service.

The customers 118 and agents 114 may communicate with and utilize the functionality of the communication service provider 102 through use of client devices (e.g., desktop computers, laptops, smart phones, etc.) that are connected to the communication service provider 102 via direct connections or through a network 116, such as the Internet or a private network connection. A client device is any type of general computing device capable of network communication with other computing devices. For example, a client device can be a personal computing device such as a desktop or workstation, a business server, or a portable computing device, such as a laptop, smart phone, or a tablet personal computer (PC). A client device can include some or all of the features, components, and peripherals of the machine 1100 shown in FIG. 11.

Customers 118 and agents 114 may interacts with the communication service provider 102 via a client-side application installed on a client device. In some embodiments, the client-side application includes a component specific to the communication service provider 102. For example, the component may be a stand-alone application, one or more application plug-ins, and/or a browser extension. However, the customers 118 and agents 114 may also interact with the communication service provider 102 via a third-party application, such as a web browser, that resides on the client device and is configured to communicate with the communication service provider 102. In either case, the client-side application presents a user interface (UI) for the customers 118 and agents 114 to interact with the communication service provider 102. For example, the client-side application may be integrated with the file system or presented via a webpage displayed using a web browser application.

To initiate a conversation, a customer 118 or agent 114 uses a client device to initiate a request to the communication service provider 102. For example, the request may be to initiate a video or voice communication session, such as a phone call, video call, and the like. When the communication service provider 102 receives a request from a customer 118 to initiate a video or voice communication with a company, the communications service provider 102 establishes a communication session between the client device of the customer 118 and a client device of an agent 114 of the company. Similarly, when the communication service provider 102 receives a request from an agent 114 to initiate a video or voice communication with a customer 118, the communication service provider 102 establishes a communication session between the client device of the agent 114 and a client device of an customer 118.

Initiating a communication session allows for data to be transmitted back and forth between the client devices of the agent 114 and the customer 118. For example, voice and/or video data received from the client device of the agent 114 is forwarded to the client device of the customer, and vice versa. This allows the customer 118 and agent 114 to conduct a conversation, such as to discuss issues being faced by the customer 118, receive support, and the like. During the conversation, a conversation manager 112 records conversation data (e.g., voice data, video data) transmitted between the client devices of the customer 118 and agent 114 as part of the communication session and stores the conversation data in a conversations database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and terminate conversations, as well as managing the storage of conversation data when requested by the client.

The stored conversation data may be subsequently used to manage, monitor, and improve operations, such as to monitor for compliance by an agent 114, to determine when a follow up call is requested to further a sales process, and the like.

FIG. 2 is a UI 200 that includes examples of options for tagging sections of the conversation, according to some example embodiments. The conversation is presented in the UI 200 after the audio has been converted to text and then the text formatter has been used to format the raw text from the conversation.

The UI 200 is referred to herein as the annotator UI and presents the transcript of the conversation for efficiently listening and reviewing conversations, seeing related annotations, which may be generated by a user or the ML model, and providing the ability to tag the conversation.

Tagging, referred to herein as annotating, includes identifying states or parameters within the conversation, such as a username, and assigning the state to the corresponding label. In some example embodiments, the user is able to create custom labels, such as labels indicative of an agent name, a statement that the conversation is recorded, a use of profanity, and so forth. Once the custom labels are created, the user is able to quickly select a piece of text and then associate the selected text with one of the labels. For example, after selecting a piece of text, the user may select from one of the custom labels presented by the UI 200 to associate the label to the selected text.

In some example embodiments, the complexity of analyzing conversations is greatly reduced by limiting the analysis to identify those labels created by the client. Instead of having to analyze millions of possible labels in an open-ended conversation, the system only has to identify from a plurality of possible labels. This reduction of complexity may be very useful as, for example, conversations in a support center tend to be very similar and deal with a limited set of possible items. Further, the user may also be concerned with certain parameters and not everything that was said. For example, beginning casual conversation talking about the weather may be of little interest for analyzing the content of the conversation.

In addition, some of the labels may be common for multiple users, or for users within the same industry, and the EIP system provides a dictionary of common labels to let the user select from the dictionary to be able to build up the custom EIP solution.

Further, the annotator UI 200 allows the user to listen to the actual conversation and, as the audio progresses, the text of the conversation is highlighted. Further, some of the words of the conversation may not be clear for the NLP processor, so words with a low confidence score are highlighted (e.g., presented in a different color font) so the user can correct them if necessary.

In some example embodiments, the UI 200 provides an option to select text and correct the formatting of the paragraphs formatted by the text formatter. The user feedback is then used to improve the training of the ML models (discussed in more detail below) that format the text.

Figure 3:
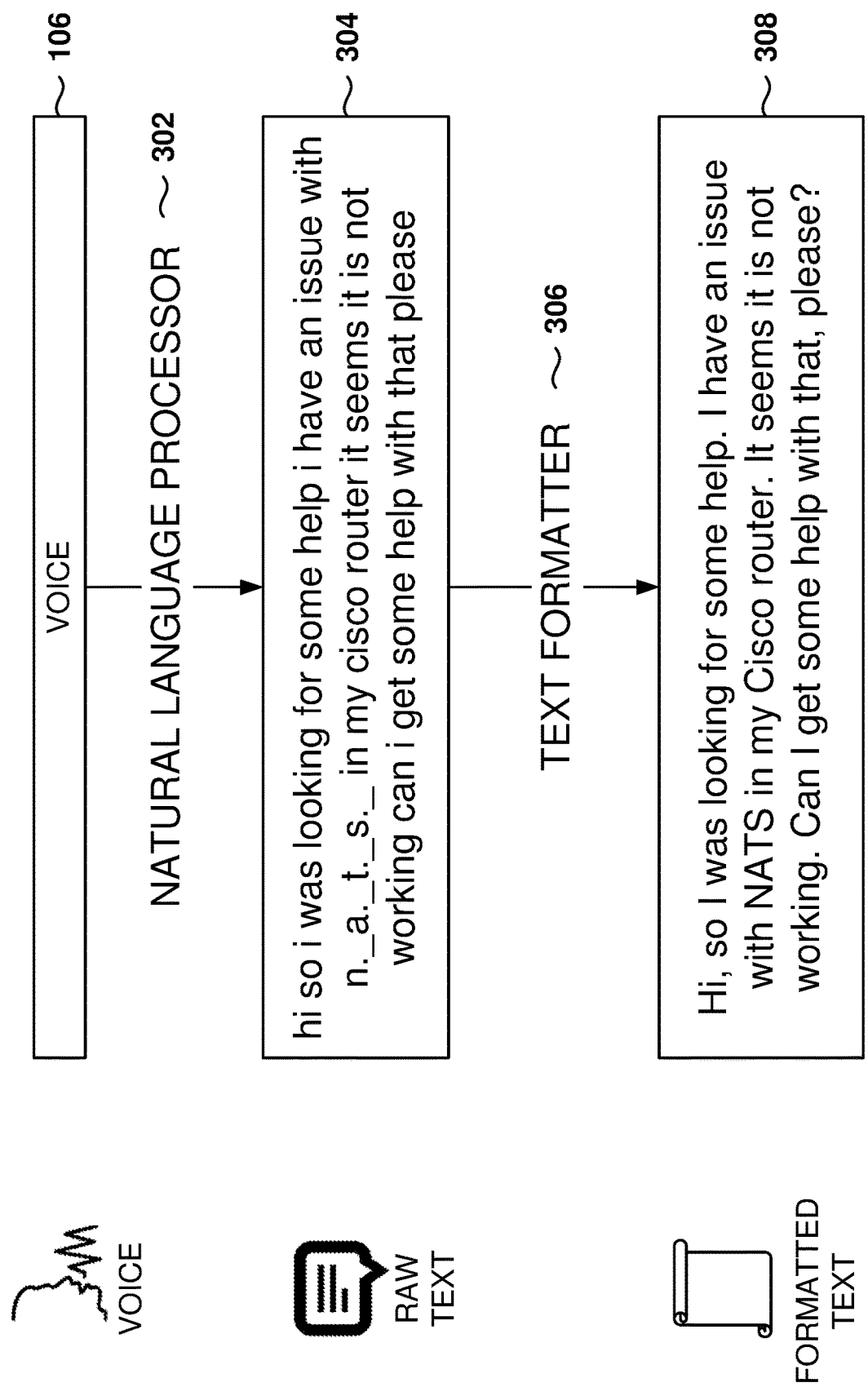
FIG. 3 illustrates a method for converting audio recordings to formatted text, according to some example embodiments.

FIG. 3 illustrates a method for converting audio recordings to formatted text, according to some example embodiments. A natural language processor (NLP) 302 processes the voice processor 106 (e.g., from conversations in a support center) and makes the speech-to-text conversion to generate the raw text 304. Although embodiments are presented with reference to transcripts from conversations in a support environment, the same principles may be utilized for other types of conversations, such as business meetings, movie soundtracks, radio programs, etc.

It is noted that it is standard practice to include trailing punctuation marks (e.g., commas) within quoted text, even though the punctuation mark is not part of the quoted text. For clarity of description in this specification, the punctuation marks that are not part of the quoted text are kept outside the quoted text to clarify how the text formatter 306 formats text and to avoid confusion between punctuation marks added by the text formatter 306 and punctuation marks added as part of the sentences in this Specification.

In some example embodiments, the formatting is performed for a paragraph that includes one or more sentences. However, the same principles may be used to format several paragraphs together, and the text formatter 306 may include paragraph breaks between paragraphs.

In the illustrated example, the raw text is "hi so i was looking for some help i have an issue with n._a._t._s. in my cisco router it seems it is not working can i get some help with that please". The format "x._" is for the capturing of single letters while the user spells a word or an acronym.

The text formatter 306 formats the raw text 304 to produce the formatted text 308. In the illustrated example, punctuation is added (e.g., periods and commas), proper capitalization is added (e.g., acronym NATS, proper name "Cisco", pronoun "I", beginning of sentences), and a question mark is added.

The result for the formatted text 308 is, "Hi, so I was looking for some help. I have an issue with NATS in my Cisco router. It seems it is not working. Can I get some help with that, please?" The changes include: adding a comma after "Hi", adding a period after "help" to finish the sentence, adding a period after "router" to finish the sentence, adding a period after "working" to finish the sentence, adding a comma after "that", adding a question mark at end of a question "please?", capitalizing beginning of sentences ("Hi", "I", "It", "Can"), forming and capitalizing acronym "NATS", and capitalizing proper name "Cisco".

The resulting formatted text 308 is grammatically correct and reflects the correct meaning of the words spoken by the user.

FIG. 4 illustrates several formatting techniques with examples, according to some embodiments. In some example embodiments, the text formatter 306 performs sequences of formatting operations that include capitalizing acronyms and word spellings 402, punctuating text 403, capitalizing names of entities 404, formatting members and Uniform Resource Locators (URLs) 405, and formatting phone numbers 406.

It is noted that the embodiments illustrated in FIG. 4 are examples and do not describe every possible embodiment. Other embodiments may utilize different formatting operations, combine two or more formatting operations into one, adding additional formatting operations, perform the formatting operations in a different order, etc. The embodiments illustrated in FIG. 4 should therefore not be interpreted to be exclusive or limiting, but rather illustrative.

The illustrated example is to format the raw text, "hi carlos how are you doing my phone number in the u._s._a._ is one one two two four four five five six six i heard you have two thousand friends in the united nations".

Capitalizing acronyms and word spellings 402 includes detecting acronyms in the raw text and formatting the acronyms as contiguous uppercase letters. Also, converting words that were spelled out by the speaker (e.g., by saying the individual letters that form a word) to a sequence of space-separated letters in uppercase.

The result of capitalizing acronyms and word spellings 402 for the example is, "hi carlos how are you doing my phone number in the USA is one one two two four four five five six six i heard you have two thousand friends in the united nations". This includes converting "u._s._a._" to "USA".

An example of formatting word spellings would be formatting text corresponding to someone spelling their name, such as raw text "jones j._o._n._e._s._" formatted as "j ones J O N E S", where the letters are converted to uppercase but not joined together as in the case of formatting an acronym.

Punctuating text 403 includes adding punctuation marks that include periods, commas, and question marks, and capitalizing the beginning of sentences. In other example embodiments, other punctuation marks can be included, such as exclamation marks, parenthesis, dashes, slashes, etc. In general, punctuating is the more challenging formatting operation because it requires understanding of the meaning of the paragraph, and there could be multiple ways of interpreting the raw text, as illustrated in the example presented in the Background section.

The result of punctuating text 403 of the example is, "Hi carlos, how are you doing? My phone number in the USA is one, one, two, two, four, four, five, five, six, six. I heard you have two thousand friends in the united nations." This includes capitalizing beginning of sentences "Hi", "My", and "I"; adding periods after "six" and "nations" to mark the end of the sentences; adding commas after "carlos" and the digits of the phone number; and adding a question mark after "doing".

Capitalizing names of entities 404 includes turning the initial to uppercase for entities, such as proper names, people, countries, companies, etc.

The result of capitalizing names of entities 404 is, "Hi Carlos, how are you doing? My phone number in the USA is one, one, two, two, four, four, five, five, six, six. I heard you have two thousand friends in the United Nations." This includes capitalizing "Carlos" and "United Nations".

Formatting members and URLs 405 includes turning the letter representation of numbers to digits and converting words corresponding to an URL to the standard URL format.

The result of formatting members and URLs 405 is "Hi Carlos, how are you doing? My phone number in the USA is one, one, two, two, four, four, five, five, six, six. I heard you have 2000 friends in the United Nations." It is noted that it is common practice to write numbers less than ten in letters instead of digits. However, in some embodiments, the letter representation is changed to digits, as in "1, 1, 2, 2, 4, 4, 5, 5, 6, 6".

An example for formatting a URL would be to change "w._w._w._twilio dot com" to "www.twilio.com". In some example embodiments the URL can be underscored, written in blue, and the corresponding link added, as in www.twilio.com".

Formatting phone numbers 406 includes representing the phone number according to standard format, which may vary depending on the country. For example, in the US, a common representation of a phone number is (111) 111-1111, but other representations are also possible. Further, a prefix of "+" may be added to international numbers.

The result of formatting phone numbers 406 is, "Hi Carlos, how are you doing? My phone number in the USA is (112) 244-5566. I heard you have 2000 friends in the United Nations." This includes converting the digits to the phone number format.

Figure 5:
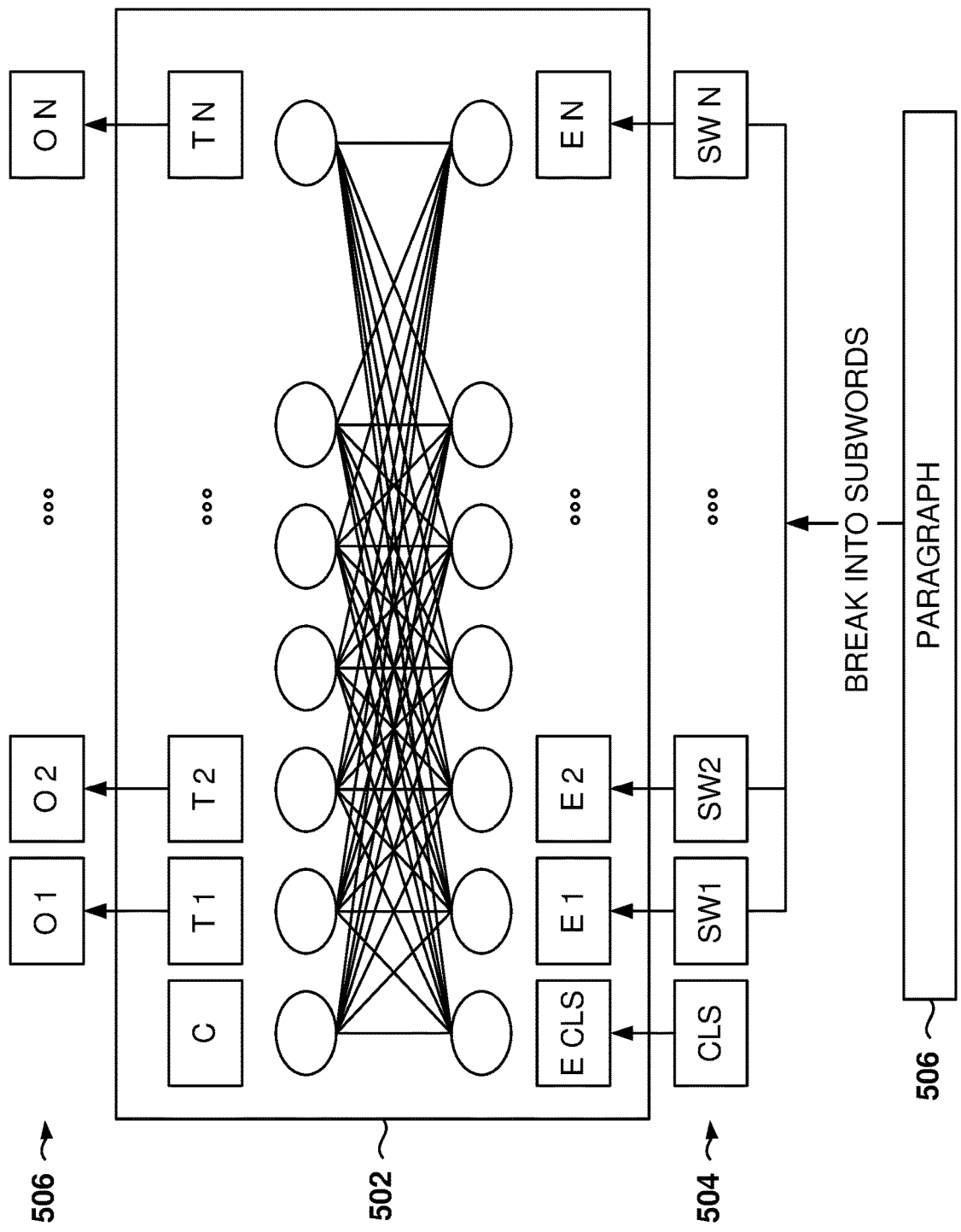
FIG. 5 illustrates a machine-learning (ML) model for formatting text, according to some example embodiments.

FIG. 5 illustrates a machine-learning (ML) model 502 for formatting text, according to some example embodiments. The ML model 502 may be used to perform one or more of the text formatting operations. For example, the ML model 502 may be used to punctuate text. Although, the example is described with reference to the punctuation operation, the ML model 502 may also be used for other text formatting operations.

In some example embodiments, the ML model 502 is a Bidirectional Encoder Representations from Transformers (BERT) model, but other embodiments may used other ML models. BERT applies bidirectional training of a Transformer, an attention model, to language modelling, in contrast to previous techniques that looked at a text sequence either from left to right or combined left-to-right and right-to-left training. Results show that BERT, a language model which is bidirectionally trained, can have a deeper sense of language context and flow than single-direction language models.

A paragraph 506 is broken into sub-words 504, also referred to as tokens, which are then used as inputs to the ML model 502. Tokenization is a way of separating a piece of text into smaller units called sub-words. The sub-word may be a complete word or a part of a word. Further, tokenization can be broadly classified into 3 types: word, character, and subword (n-gram characters) tokenization. For example, the sentence, "Jet makers feud over seat width with big orders at stake," can be broken into sub-words as "_J et_makers_feud_over_seat_width_with_big_orders_at_ stake," but other tokenization of the sentence may generate different sub-words.

In some example embodiments, the tokenization tool is SentencePiece, which is used to generate the sub-words, but other tools may be used. SentencePiece is a language-independent subword tokenizer and detokenizer designed for Neural-based text processing, including Neural Machine Translation, and provides implementations for subword units. SentencePiece can train subword models directly from raw sentences. SentencePiece implements two subword segmentation algorithms, byte-pair-encoding (BPE) and unigram language model.

An initial marker CLS, a control token, is included at the beginning of the sequence of sub-words 504. The ML model 502 then outputs a vector 506 with a value for each subword, the value indicating a punctuation mark occurring before the subword if it exists, otherwise a null value, such as zero.

For example, a paragraph "i want an ice cream how are you" generates sub-words "i w #ant an ice cre #am how are you [end]" where [end] marks the end of the paragraph. The sub-words are then encoded into an index corresponding to a value in a dictionary, such as [24 35 978 46 571 15 147 647 8 100 999]. The output is a vector with the punctuation marks or zeros where the punctuation mark does not exist, such as [0 0 0 0 0 0 0. 0 0 ?] that identifies the period before "how" and the question mark before the end of the paragraph.

If the ML model 502 is used for capitalization, the resulting vector would be [C NC NC NC NC NC NC C NC NC], where C is for capitalized and NC is for non-capitalized. The output shows that the words "I" and "How" are capitalized and the rest are not.

Figure 6:
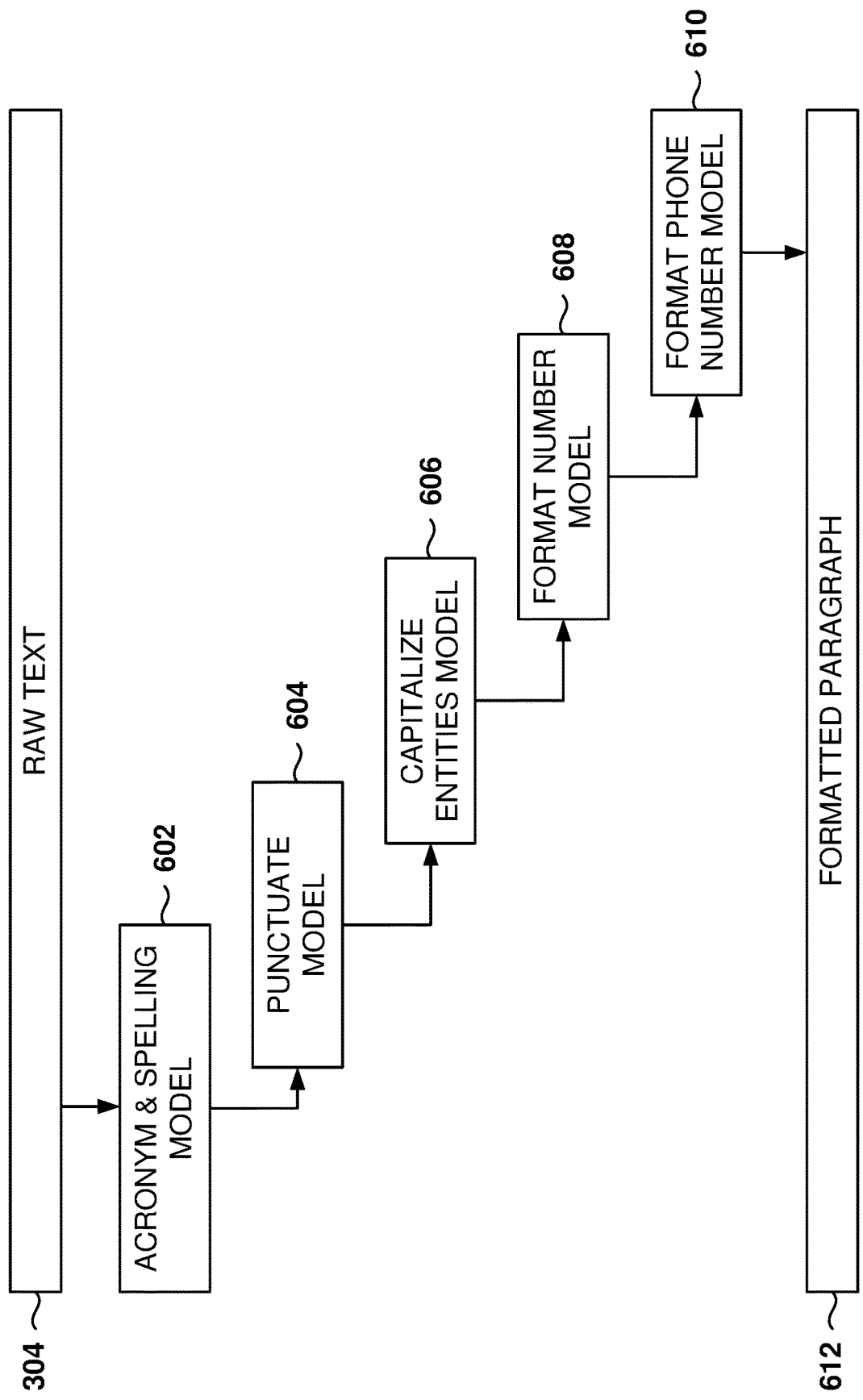
FIG. 6 shows a flowchart of a process for converting raw text to a formatted paragraph using multiple models, according to some example embodiments.

FIG. 6 shows the flow of a process for converting raw text 304 to a formatted paragraph 612 using multiple models, according to some example embodiments. In some example embodiments, the formatting operations are performed by ML models, and in other embodiments, the formatting operations may be performed using heuristics, that is, logic applied to the raw text. Further, ML models may be combined with heuristics to perform the different operations.

In the illustrated example in FIG. 6, the formatting is performed by a series of ML models: an acronym model 602, a punctuate model 604, a capitalize-entities model 606, a format-number model 608, and a format-phone-number model 610.

The ML models are used sequentially, and the output from the last model is the formatted paragraph 612. In some example embodiments, the ML models may operate in parallel, and then the results combined, e.g., acronym formatting and punctuation are performed in parallel and then combined.

An example of a heuristic method for capitalizing entities includes having a dictionary of words that are capitalized, such as proper names, companies, titles, etc. A search of the dictionary will result in the words that are capitalized according to the dictionary.

An example of a heuristic method for formatting numbers may include regular expressions to format a sequence of digits. The logic searches for ten digits, and when they are found, the ten digits are converted to phone format. However, the ML model for formatting phone numbers may find phone numbers that a regular expression may miss, such as when a user says, "My phone number is two, four, four, five, five, six, six; area code one, one, two." Given enough examples, the ML model may be trained to detect this type of pattern where the area code is given after the other digits in the phone number.

Further, it is noted that there may be regional differences on how the phone numbers are formatted, so the heuristic methods and the ML models will have to account for the location where the conversation takes place.

Figure 7:
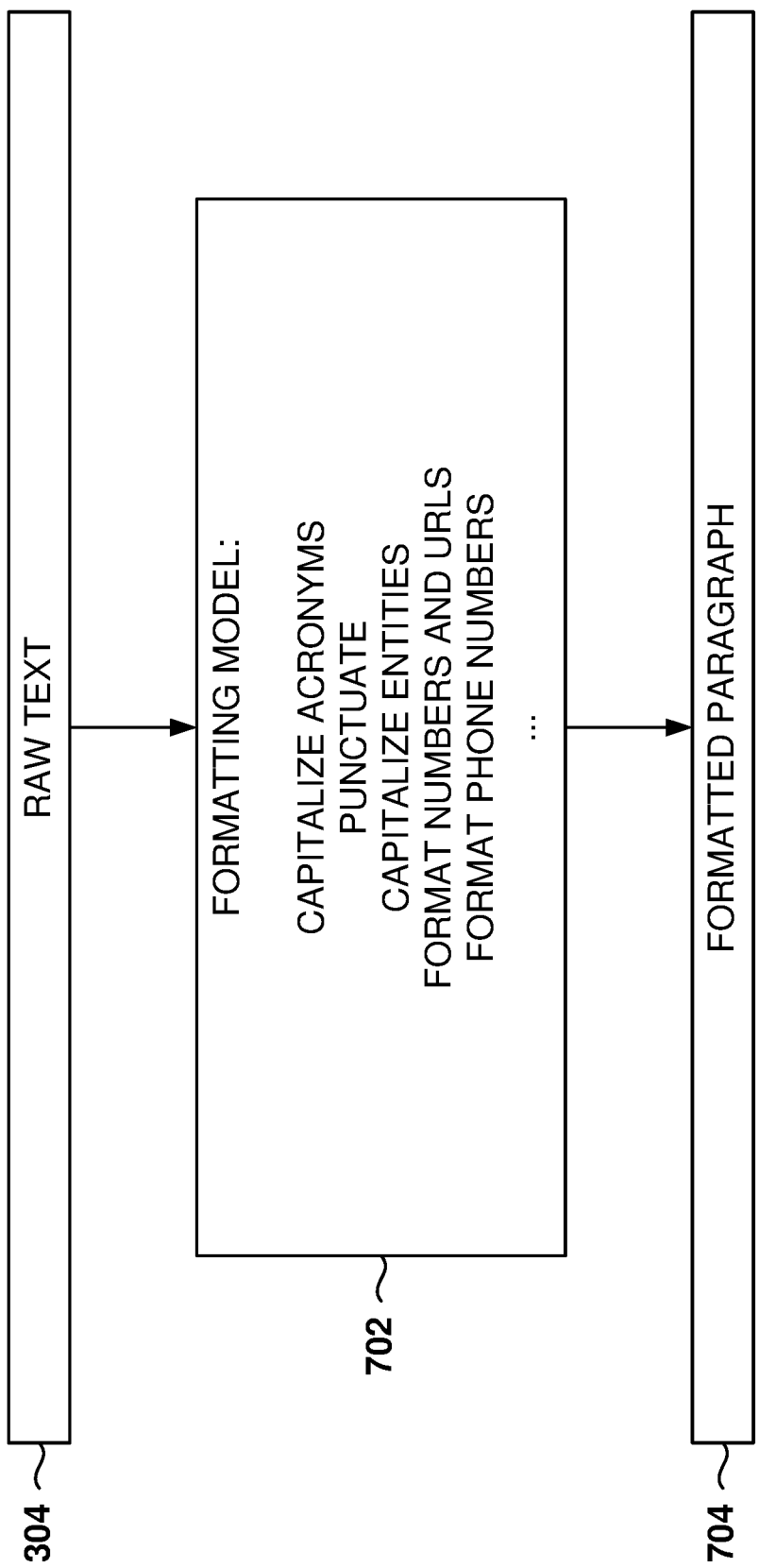
FIG. 7 shows a flowchart of a process for converting raw text to a formatted paragraph using a multi-purpose model, according to some example embodiments.

FIG. 7 shows the flow of a process for converting raw text 304 to a formatted paragraph 704 using a multi-purpose model, according to some example embodiments. The formatting model 702 performs the same operations as the individual ML models described with reference to FIG. 6, and these operations include capitalizing acronyms and word spellings, punctuating text, capitalizing names of entities, formatting members and Uniform Resource Locators (URLs), and formatting phone numbers.

The output from the formatting model 702 in the formatted paragraph 704. In other embodiments, the formatting model 702 may perform a subset of formatting operations and may be used with other individual ML models that perform a formatting operation. To train the formatting model 702, the training data includes values showing the different formatting options.

Some word processing programs include tools to check grammar and spelling. However, this type of tool is based on a user entering formatted text with some errors, so checking grammar and spelling is rather basic operations that may be satisfied with a few rules.

However, the text formatter goes beyond simple grammar checks and spelling because the text formatter has a raw of words, without any relationship defined among the words. The text formatter has to "learn" the meaning of the paragraph and format accordingly. As illustrated in the example described in the Background section, a sentence may be grammatically correct, but, if not punctuated correctly, convey the wrong meaning intended by the speaker. Further, word processors do not analyze the raw text from a paragraph and determine how the paragraph is broken into meaningful sentences. For example, a word processor will not put a period between two lowercase words.

Figure 8:
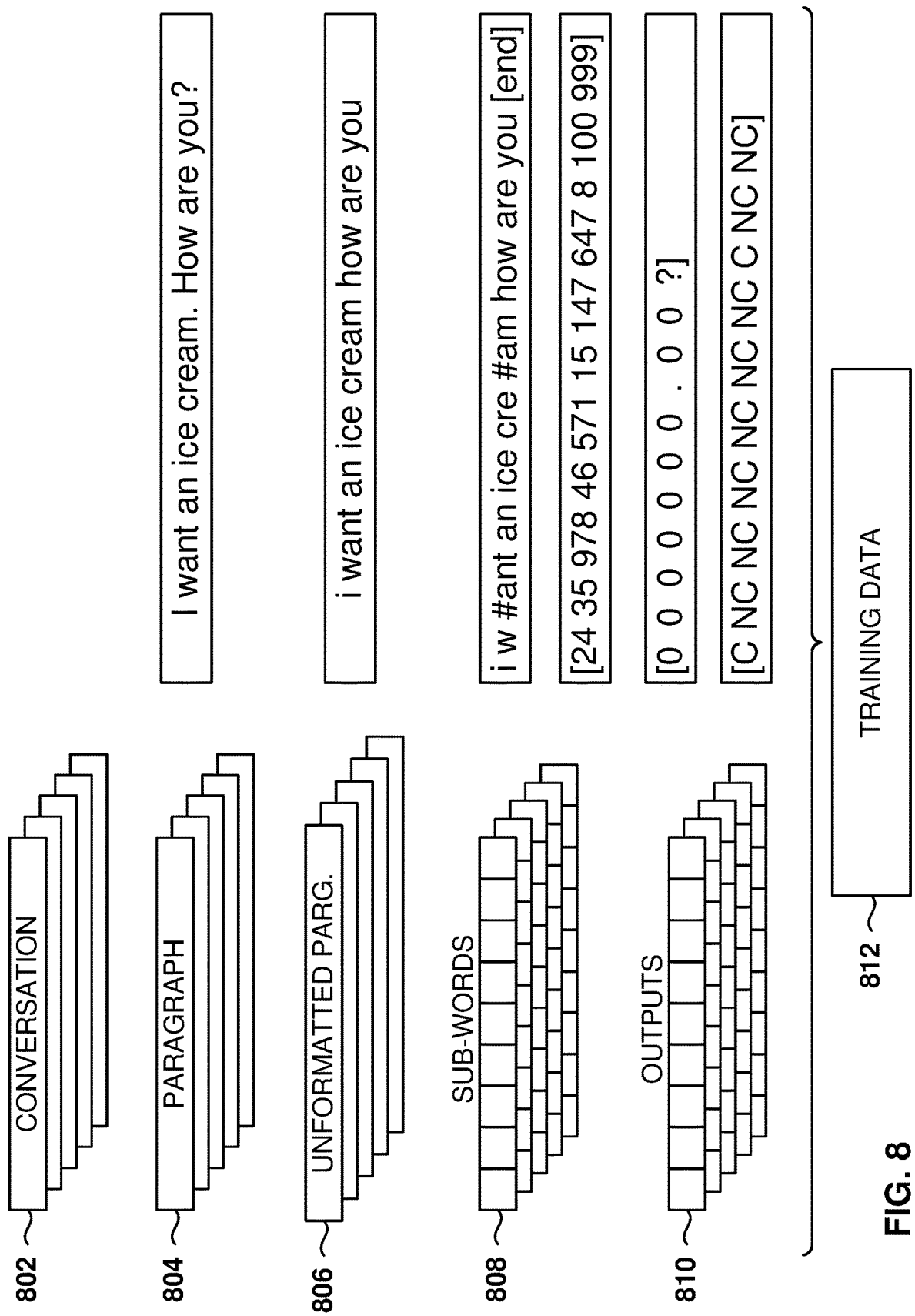
FIG. 8 illustrates the process for creating the training data, according to some example embodiments.

FIG. 8 illustrates the process for creating the training data, according to some example embodiments. In some example embodiments, the training data is based on formatted conversations 802, but other types of training data may be utilized, such as movie scripts, newspaper articles, books, transcribed speeches, etc.

The conversations 802 are broken into paragraphs 804. In the case of conversations, the paragraphs may include one turn by one speaker of the conversation, but other methods may be used to break the conversation into paragraphs, such as by breaking the conversation into logical blocks, and assigning each logical block to a paragraph, e.g., "I want an ice cream. How are you?"

The paragraphs 804 are stripped of any formatting to create unformatted paragraphs 806 that include a list of lowercase words, e.g., "i want an ice cream how are you".

The unformatted paragraphs 806 are broken into sub-words 808, e.g., "i w #ant an ice cre #am how are you [end]". The sub-words are then encoded into vectors, each sub-word represented by an index into a dictionary of words, e.g., [24 35 978 46 571 15 147 647 8 100 999].

Further, the expected formatting outputs 810 from the original paragraphs are encoded into vectors with one value per sub-word, and optionally markers embedded at the beginning, middle, or the end. For example, a vector that indicates the punctuation marks is [0 0 0 0 0 0 0. 0 0 ?], and a vector that describes capitalization is [C NC NC NC NC NC NC C NC NC], as described above.

The encoded sub-words 808 and the corresponding outputs 810 are then combined (e.g., to form a matrix) to create the training data 812 to train the ML model.

It is noted that for the use case of analyzing conversations associated with supported calls, using training data from properly formatted conversations will accelerate the development of an accurate ML formatting model because the context of the support conversations is included within the training data. For example, support conversations include turn taking by the speakers, which may not be the case with other types of training data, such as books, articles, etc.

Figure 9:
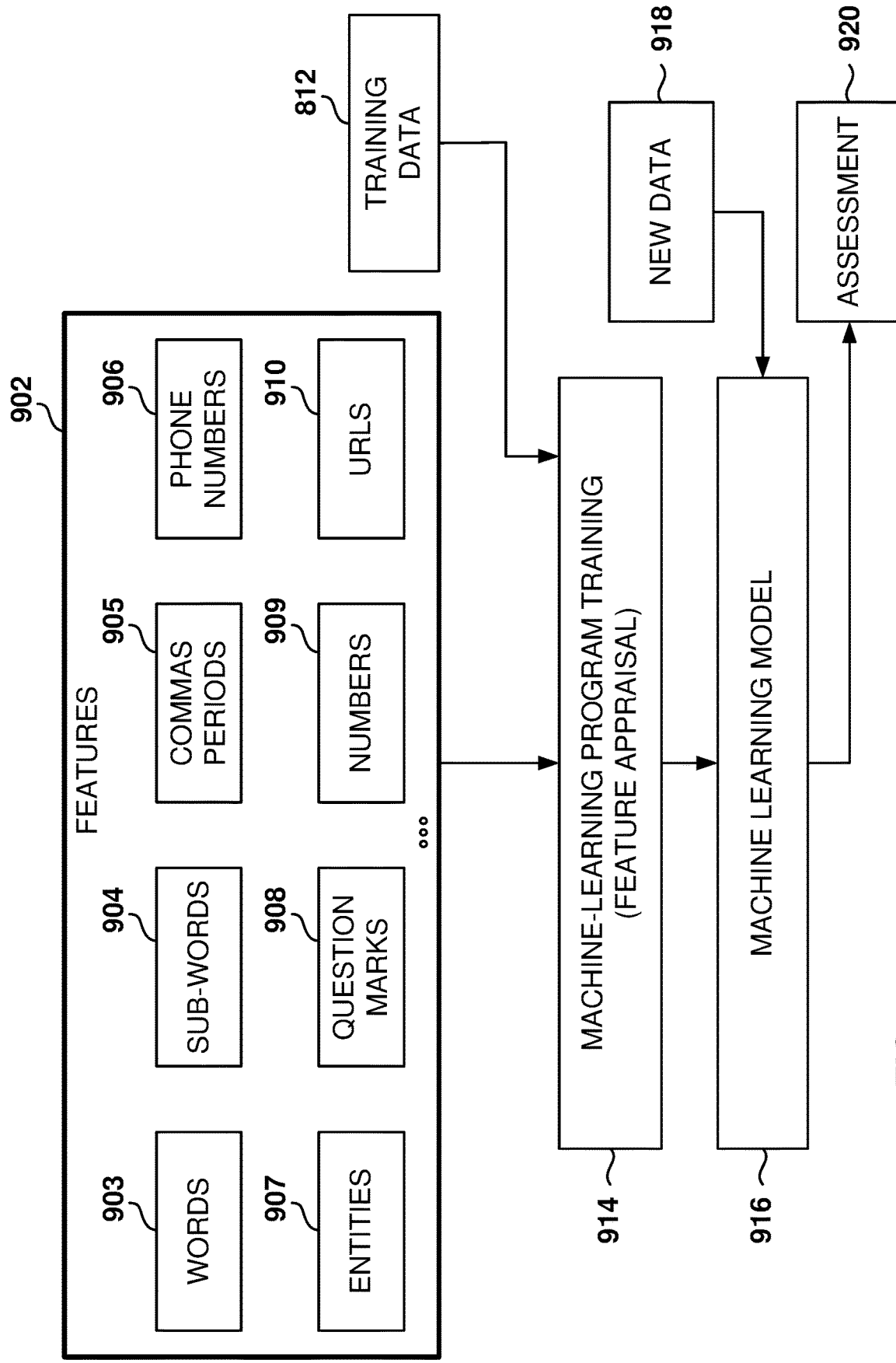
FIG. 9 illustrates the training and use of a machine-learning model, according to some example embodiments.

FIG. 9 illustrates the training and use of a machine-learning model, according to some example embodiments. In some example embodiments, machine-learning (ML) models 916, are utilized to format raw text.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 916 from example training data 912 in order to make data-driven predictions or decisions expressed as outputs or assessments 920. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some embodiments, the ML model 916 performs one or more formatting functions, e.g., the formatting operations described above with reference to FIG. 4.

The training data 812 comprises examples of values for the features 902. In some example embodiments, the training data comprises labeled data with examples of values for the features 902 and labels indicating the outcome, such where a punctuation mark is, a word that is to be capitalized, etc. The machine-learning algorithms utilize the training data 812 to find correlations among identified features 902 that affect the outcome. A feature 902 is an individual measurable property of a phenomenon being observed. The concept of a feature 902 is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 902 may be of different types and may include one or more of words 903 (e.g., words in a conversation), sub-words 904, commas and periods 905, phone numbers 906, entities 907, question marks 908, numbers 909, URLs 910, etc.

During training 914, the ML program, also referred to as ML algorithm or ML tool, analyzes the training data 812 based on identified features 902 and configuration parameters 911 defined for the training. The result of the training 914 is the ML model 916 that is capable of taking inputs to produce assessments 920.

Training an ML algorithm involves analyzing large amounts of data (e.g., from several gigabytes to a terabyte or more) in order to find data correlations. The ML algorithms utilize the training data 812 to find correlations among the identified features 902 that affect the outcome or assessment 920. In some example embodiments, the training data 812 includes labeled data, which is known data for one or more identified features 902 and one or more outcomes, such as punctuation marks, URLs, entities, etc.

The ML algorithms usually explore many possible functions and parameters before finding what the ML algorithms identify to be the best correlations within the data; therefore, training may make use of large amounts of computing resources and time.

When the ML model 916 is used to perform an assessment 920, new data 918 is provided as an input to the ML model 916, and the ML model 916 generates the assessment 920 as output. For example, when raw text is punctuated, the ML model 916 determines where the punctuation marks are located.

Figure 10:
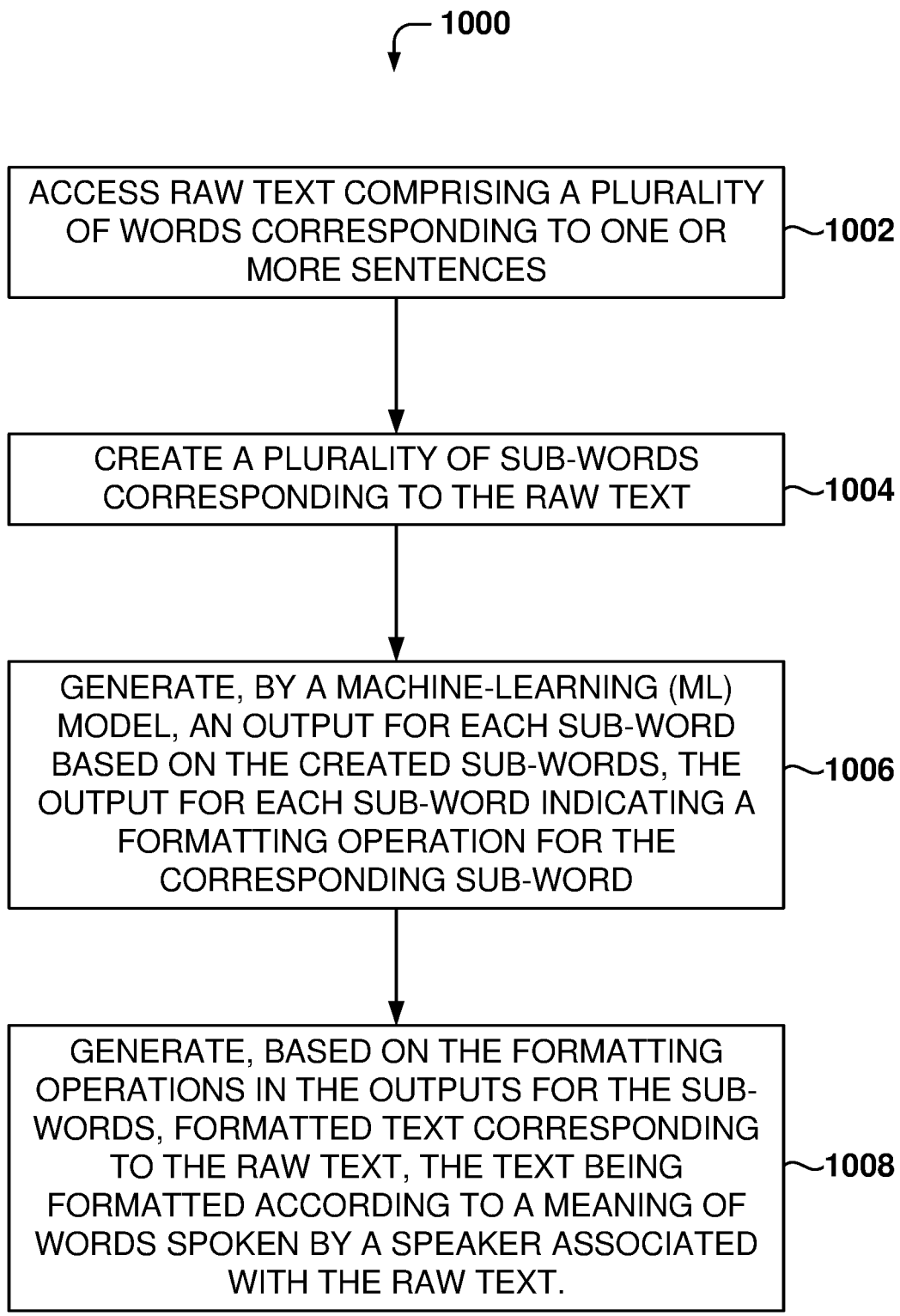
FIG. 10 is a flowchart of a method for formatting raw text, according to some example embodiments.

FIG. 10 is a flowchart of a method 1000 for formatting raw text, according to some example embodiments. While the various operations in this flowchart are presented and described sequentially, one of ordinary skill will appreciate that some or all of the operations may be executed in a different order, be combined or omitted, or be executed in parallel.

Operation 1002 is for accessing raw text comprising a plurality of words corresponding to one or more sentences.

From operation 1002, the method 1000 flows to operation 1004 for creating a plurality of sub-words corresponding to the raw text.

At operation 1006, a machine-learning (ML) model generates an output for each sub-word based on the created sub-words. The output for each sub-word indicates a formatting operation for the corresponding sub-word.

From operation 1006, the method 1000 flows to operation 1008 for generating, based on the formatting operations in the outputs for the sub-words, formatted text corresponding to the raw text. The text is formatted according to a meaning of words spoken by a speaker associated with the raw text.

In one example, the raw text comprises unformatted text excluding any punctuation.

In one example, the formatted text comprises text with correct grammar, proper punctuation, and proper capitalization.

In one example, the ML model outputs punctuation marks for the sub-words, the punctuation marks comprising one or more of: commas, periods, or question marks.

In one example, the ML model is obtained by training an ML program with training data that includes words from conversations organized into paragraphs, proper formatting of the paragraphs, and corresponding raw text of the paragraphs.

In one example, the features used by the ML program include sub-words, commas, periods, and question marks.

In one example, the ML model capitalizes acronyms and formats words that have been spelled out by the speaker.

In one example, the ML model formats phone numbers.

In one example, generating formatted text comprises one or more of: capitalizing acronyms and word spellings, punctuating text, capitalizing names of entities, formatting members and Uniform Resource Locators (URLs), or formatting phone numbers.

In one example, each operation for formatting text is performed by a respective ML model.

In one example, the operations for formatting text are performed by a multi-purpose ML model.

In one example, generating formatted text includes utilizing at least one ML model and at least one heuristic formatting algorithm.

Another general aspect is for a system that includes a memory comprising instructions and one or more computer processors. The instructions, when executed by the one or more computer processors, cause the one or more computer processors to perform operations comprising: accessing raw text comprising a plurality of words corresponding to one or more sentences; creating a plurality of sub-words corresponding to the raw text; generating, by a machine-learning (ML), an output for each sub-word based on the created sub-words, the output for each sub-word indicating a formatting operation for the corresponding sub-word; and generating, based on the formatting operations in the outputs for the sub-words, formatted text corresponding to the raw text, the text being formatted according to a meaning of words spoken by a speaker associated with the raw text.

In yet another general aspect, a machine-readable storage medium (e.g., a non-transitory storage medium) includes instructions that, when executed by a machine, cause the machine to perform operations comprising: accessing raw text comprising a plurality of words of corresponding to one or more sentences; creating a plurality of sub-words corresponding to the raw text; generating, by a machine-learning (ML) model, an output for each sub-word based on the created sub-words, the output for each sub-word indicating a formatting operation for the corresponding sub-word; and generating, based on the formatting operations in the outputs for the sub-words, formatted text corresponding to the raw text, the text being formatted according to a meaning of words spoken by a speaker associated with the raw text.

Figure 11:
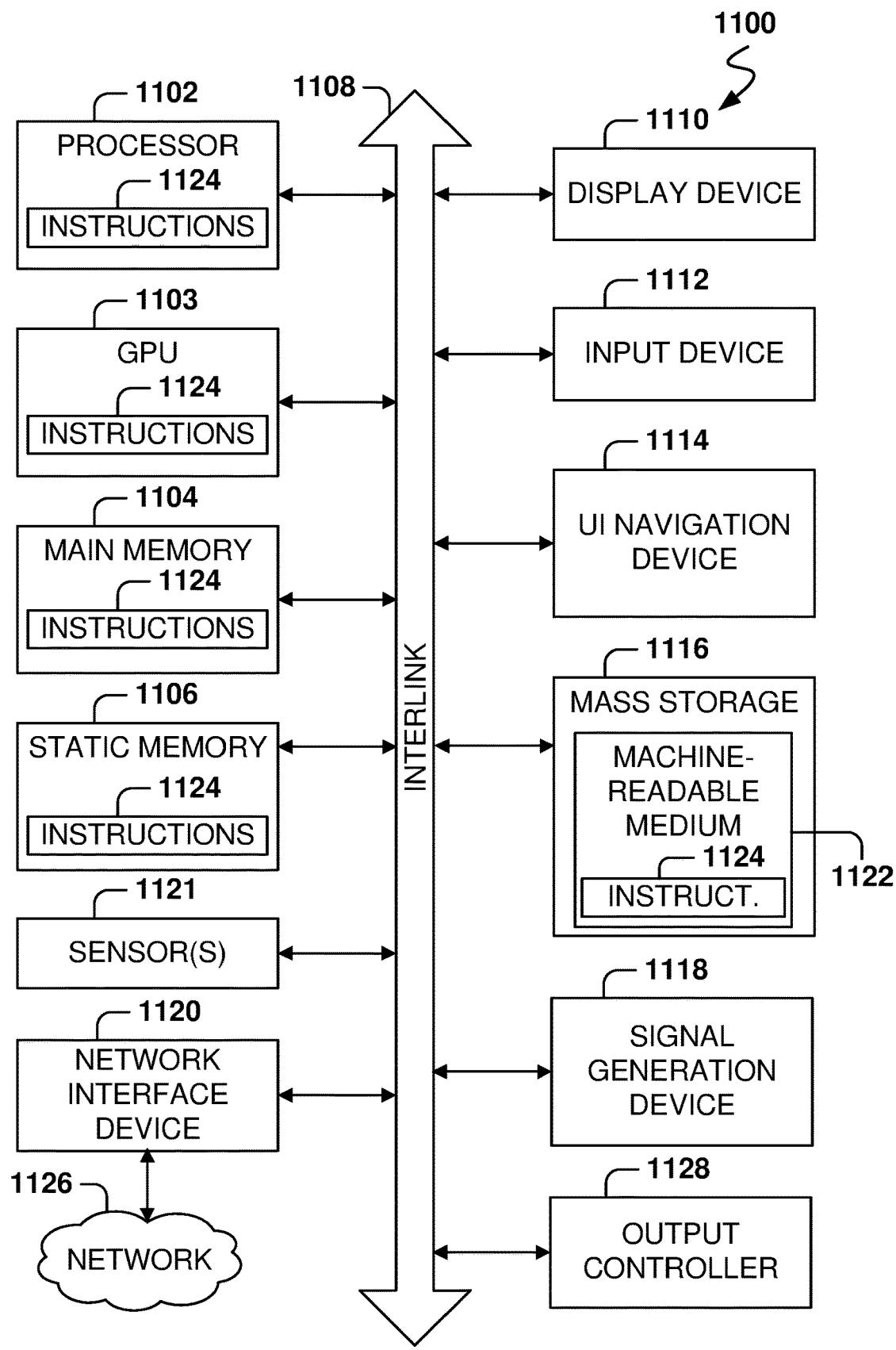
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   accessing raw text comprising a plurality of words corresponding to one or more sentences;
   creating a plurality of sub-words corresponding to the raw text;
   generating, by a machine-learning (ML) model, an output for each sub-word based on the created sub-words, the output for each sub-word indicating a formatting operation for the corresponding sub-word; and
   generating, based on the formatting operations in the outputs for the sub-words, formatted text corresponding to the raw text, the text being formatted according to a meaning of words spoken by a speaker associated with the raw text.

2. The method as recited in claim 1, wherein the raw text comprises unformatted text excluding any punctuation.

3. The method as recited in claim 1, wherein the formatted text comprises text with correct grammar, proper punctuation, and proper capitalization.

4. The method as recited in claim 1, wherein the ML model outputs punctuation marks for the sub-words, the punctuation marks comprising one or more of: commas, periods, or question marks.

5. The method as recited in claim 1, wherein the ML model is obtained by training an ML program with training data that includes words from conversations organized into paragraphs, proper formatting of the paragraphs, and corresponding raw text of the paragraphs.

6. The method as recited in claim 5, wherein features used by the ML program include sub-words, commas, periods, and question marks.

7. The method as recited in claim 1, wherein the ML model capitalizes acronyms and formats words that have been spelled out by the speaker.

8. The method as recited in claim 1, wherein the ML model formats phone numbers.

9. The method as recited in claim 1, wherein generating formatted text comprises one or more of:
   capitalizing acronyms and word spellings;
   punctuating text;

capitalizing names of entities;

formatting members and Uniform Resource Locators (URLs); or formatting phone numbers.

10. The method as recited in claim 9, wherein each operation for formatting text is performed by a respective ML model.

11. The method as recited in claim 9, wherein the operations for formatting text are performed by a multi-purpose ML model.

12. The method as recited in claim 1, wherein generating formatted text includes utilizing at least one ML model and at least one heuristic formatting algorithm.

13. A system comprising:

a memory comprising instructions; and one or more computer processors, wherein the instructions, when executed by the one or more computer processors, cause the system to perform operations comprising:

accessing raw text comprising a plurality of words corresponding to one or more sentences;

creating a plurality of sub-words corresponding to the raw text;

generating, by a machine-learning (ML) model, an output for each sub-word based on the created sub-words, the output for each sub-word indicating a formatting operation for the corresponding sub-word; and generating, based on the formatting operations in the outputs for the sub-words, formatted text corresponding to the raw text, the text being formatted according to a meaning of words spoken by a speaker associated with the raw text.

14. The system as recited in claim 13, wherein the raw text comprises unformatted text excluding any punctuation, wherein the formatted text comprises text with correct grammar, proper punctuation, and proper capitalization.

15. The system as recited in claim 13, wherein the ML model outputs punctuation marks for the sub-words, the punctuation marks comprising one or more of: commas, periods, or question marks.

16. The system as recited in claim 13, wherein the ML model is obtained by training an ML program with training data that includes words from conversations organized into paragraphs, proper formatting of the paragraphs, and corresponding raw text of the paragraphs.

17. The system as recited in claim 16, wherein features used by the ML program include sub-words, commas, periods, and question marks.

18. The system as recited in claim 13, wherein the ML model capitalizes acronyms and formats words that have been spelled out by the speaker.

19. A tangible machine-readable storage medium including instructions that, when executed by a machine, cause the machine to perform operations comprising:

accessing raw text comprising a plurality of words corresponding to one or more sentences;

creating a plurality of sub-words corresponding to the raw text;

generating, by a machine-learning (ML) model, an output for each sub-word based on the created sub-words, the output for each sub-word indicating a formatting operation for the corresponding sub-word; and generating, based on formatting operations in the outputs for the sub-words, formatted text corresponding to the raw text, the text being formatted according to a meaning of words spoken by a speaker associated with the raw text.

20. The tangible machine-readable storage medium as recited in claim 19, wherein the raw text comprises unformatted text excluding any punctuation, wherein the formatted text comprises text with correct grammar, proper punctuation, and proper capitalization.

21. The tangible machine-readable storage medium as recited in claim 19, wherein the ML model outputs punctuation marks for the sub-words, the punctuation marks comprising one or more of: commas, periods, or question marks.

22. The tangible machine-readable storage medium as recited in claim 19, wherein the ML model is obtained by training an ML program with training data that includes words from conversations organized into paragraphs, proper formatting of the paragraphs, and corresponding raw text of the paragraphs.

23. The tangible machine-readable storage medium as recited in claim 22, wherein features used by the ML program include sub-words, commas, periods, and question marks.

* * * * *